United States Patent
Yoshihara et al.

(10) Patent No.: US 9,291,125 B2
(45) Date of Patent: Mar. 22, 2016

(54) GAS ENGINE, CONTROL SYSTEM AND CONTROL METHOD FOR GAS ENGINE

(75) Inventors: Shintaro Yoshihara, Kobe (JP); Youhei Nakajima, Kobe (JP); Hidekazu Iwasaki, Kobe (JP); Kenji Yoshimura, Kobe (JP); Yoshishige Sakai, Miki (JP); Yoshirou Tokunaga, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/113,361

(22) PCT Filed: Apr. 16, 2012

(86) PCT No.: PCT/JP2012/002622
§ 371 (c)(1),
(2), (4) Date: Dec. 19, 2013

(87) PCT Pub. No.: WO2012/144187
PCT Pub. Date: Oct. 26, 2012

(65) Prior Publication Data
US 2014/0102403 A1    Apr. 17, 2014

(30) Foreign Application Priority Data
Apr. 22, 2011   (JP) ................. 2011-095830

(51) Int. Cl.
*F02M 25/03* (2006.01)
*F02D 35/02* (2006.01)
(Continued)

(52) U.S. Cl.
CPC ............ *F02M 25/03* (2013.01); *F02D 19/024* (2013.01); *F02D 19/12* (2013.01); *F02D 35/027* (2013.01);
(Continued)

(58) Field of Classification Search
CPC ............ F02D 35/0227; F02M 25/022; F02M 21/0275; F02M 25/14; F02M 25/025; F02B 47/02
USPC ...... 123/25 A, 25 B, 25 J, 25 R; 701/101–105
See application file for complete search history.

(56) References Cited

U.S. PATENT DOCUMENTS 4,466,405 A * 8/1984 Hattori et al. ............ 123/406.42
4,542,727 A    9/1985 Britsch et al.
(Continued)

FOREIGN PATENT DOCUMENTS

JP    B2-3-37029    6/1991
JP    A-5-10164     1/1993
(Continued)

OTHER PUBLICATIONS

International Search Report issued in International Patent Application No. PCT/JP2012/002622 mailed Jun. 12, 2012.
(Continued)

*Primary Examiner* — Lindsay Low
*Assistant Examiner* — Long T Tran
(74) *Attorney, Agent, or Firm* — Oliff PLC

(57) ABSTRACT

A control system in a gas engine includes a water injection means which injects water toward an interior of a cylinder in the gas engine; a water injection control means which controls the water injection section; and a knocking occurrence ratio measuring means which measures a measurement value of a knocking occurrence ratio in the cylinder. The water injection control means controls the water injection means to set the amount of the water injected toward the interior of the cylinder, based on a deviation between the measurement value and a target value.

10 Claims, 8 Drawing Sheets

(51) Int. Cl.
   F02M 25/022 (2006.01)
   F02M 21/02 (2006.01)
   F02D 19/02 (2006.01)
   F02M 25/028 (2006.01)
   G01L 23/22 (2006.01)
   F02D 19/12 (2006.01)
   F02D 41/00 (2006.01)

(52) U.S. Cl.
   CPC ....... F02M 21/0275 (2013.01); F02M 21/0278 (2013.01); F02M 21/0284 (2013.01); F02M 25/028 (2013.01); F02M 25/0227 (2013.01); G01L 23/227 (2013.01); F02D 41/0027 (2013.01); F02D 2200/0802 (2013.01); Y02T 10/121 (2013.01); Y02T 10/32 (2013.01)

(56) References Cited

U.S. PATENT DOCUMENTS

| | | | | |
|---|---|---|---|---|
| 4,558,665 A | * | 12/1985 | Sandberg et al. | 123/25 C |
| 4,660,535 A | * | 4/1987 | Asano | 123/406.21 |
| 5,125,366 A | * | 6/1992 | Hobbs | 123/25 C |
| 7,444,236 B2 | * | 10/2008 | Wiles | 701/114 |
| 8,434,431 B2 | * | 5/2013 | Fried et al. | 123/25 R |
| 2007/0119391 A1 | * | 5/2007 | Fried et al. | 123/25 A |
| 2007/0119392 A1 | * | 5/2007 | Leone et al. | 123/25 C |
| 2010/0107995 A1 | * | 5/2010 | Kamiyama et al. | 123/41.02 |
| 2010/0121559 A1 | * | 5/2010 | Bromberg et al. | 701/111 |
| 2010/0326399 A1 | * | 12/2010 | Pendray | 123/25 J |
| 2011/0108000 A1 | * | 5/2011 | Williams et al. | 123/25 C |
| 2011/0224889 A1 | * | 9/2011 | Imamura et al. | 701/111 |
| 2012/0029795 A1 | * | 2/2012 | Surnilla et al. | 701/111 |
| 2013/0006505 A1 | * | 1/2013 | Shinagawa et al. | 701/108 |

FOREIGN PATENT DOCUMENTS

| | | |
|---|---|---|
| JP | A-2010-84681 | 4/2010 |
| WO | WO 2010/038373 A1 | 4/2010 |

OTHER PUBLICATIONS

Nov. 14, 2014 Search Report issued in European Application No. 12774490.2.

* cited by examiner

GAS ENGINE, CONTROL SYSTEM AND CONTROL METHOD FOR GAS ENGINE

TECHNICAL FIELD

The present invention relates to a control system and a control method for a gas engine which executes control for suppressing a knocking, and a gas engine including the control system.

BACKGROUND ART

In recent years, to achieve a high fuel efficiency and a high power generation efficiency, there has been proposed a power generation plant which employs a huge reciprocating gas engine as a driving source of a generator. As an ignition method of an air-fuel mixture in such a gas engine for power generation, there is known a spark ignition method which ignites the air-fuel mixture by a spark generated between electrodes of an ignition plug. In order to optimize the efficiency of the gas engine and further promote energy saving in the power generation plant, it is considered that it is necessary to activate the gas engine in a state in which an ignition timing is advanced up to MBT (minimum advance for best torque). However, as the ignition timing is advanced, a temperature and a pressure in an interior of a combustion chamber increase. This may lead to a situation in which a knocking is more likely to occur and NOx emissions increase. If the knocking occurs frequently, the engine may be damaged, and NOx may pollute air.

Patent Literature 1 discloses a knocking suppressing system for a gasoline engine in a vehicle. According to this control system, when a running state of the engine is within a high load range, water is injected toward a cylinder. In this control, it is expected that the cylinder is cooled by latent heat of evaporation of the water, and thus occurrence of a knocking is suppressed.

CITATION LIST

Patent Literature

Patent Literature 1: Japanese Laid-Open Patent Application Publication No. Hei. 5-10164

SUMMARY OF INVENTION

Technical Problem

However, according to the control system disclosed in Patent Literature 1, a water injection amount is adjusted according to a throttle opening degree and an engine speed. The water is injected irrespective of an actual combustion state, i.e., whether or not the knocking is actually occurring. In other words, the water is injected irrespective of whether or not it is necessary to inject the water, in light of the actual combustion state. In such a control method, the control system does not detect how the combustion state is changed as a result of injection of the water. Therefore, the control system is incapable of reflecting how the combustion state is changed as a result of injection of the water, on control that will be executed thereafter. Thus, the conventional control system is unable to realize a situation in which occurrence of the knocking is suppressed in good correspondence with the actual combustion state, and control is executed in view of improvement of the efficiency of the engine while suppressing occurrence of the knocking.

Accordingly, an object of the present invention is to suppress occurrence of a knocking in good correspondence with the actual combustion state and improve the efficiency of the gas engine while suppressing occurrence of the knocking.

Solution to Problem

A control system in a gas engine of the present invention comprises a water injection means which injects water toward an interior of a cylinder in the gas engine; a water injection control means which controls an amount of the water injected from the water injection means; and a knocking occurrence ratio measuring means which measures a measurement value of a knocking occurrence ratio in the cylinder; wherein the water injection control means controls the water injection means to set the amount of the water injected toward the interior of the cylinder, based on a deviation between the measurement value and the target value.

The "knocking occurrence ratio" is an indicator directly indicating a frequency of occurrence of the knocking or a rate of occurrence of the knocking, and is an indicator indicating an actual combustion state. For example, the knocking occurrence ratio is calculated by dividing a total number of engine cycles in which the knocking has occurred during a passage of a predetermined number of engine cycles which are back from a present time point, by the predetermined number, and may change with time. Thus, the "knocking occurrence ratio" does not mean evaluation of a single measurement value obtained by, for example, a knocking sensor in a particular engine cycle, but means evaluation of a plurality of measurement values obtained by, for example, the knocking sensor, in respective of a plurality of engine cycles which are within a specified period from a past time point to a present time point. Thus, the "knocking occurrence ratio" includes a past history and has a characteristic which is easily handled as an evaluation indicator which is stable and does not fluctuate rapidly and steeply. Or, the "knocking occurrence ratio" may be calculated by moving average (simple moving average, weighted moving average, exponential weighted moving average). In the present specification, a cycle which goes through four strokes, which are an intake stroke, a compression stroke, an expansion stroke and an exhaust stroke, will be referred to one engine cycle.

In accordance with the present invention, the measurement value of the knocking occurrence ratio having a such a characteristic is compared to the target value and the amount of the water injected toward the interior of the cylinder is set based on the deviation between the measurement value and the target value. That is, random water injection is not performed, or water injection based on a running parameter which does not directly indicate a knocking occurrence state is not performed, but the water injection amount is set based on the knocking occurrence frequency and the target value. That is, the water is injected based on the actual combustion state. This allows a cylinder internal temperature to be lowered by the latent heat of evaporation of the water injected toward the interior of the cylinder, and hence the knocking to be lessened without retarding the ignition timing. Since the knocking is lessened without retarding the ignition timing, it becomes possible to ensure an advancement allowance of the ignition timing (amount with which the ignition timing can be advanced) within a range in which the measurement value of the knocking occurrence ratio can be prevented from increasing excessively. Because of this, the efficiency of the gas engine can be improved.

The control system in the gas engine may further comprise an ignition means which ignites an air-fuel mixture supplied to the interior of the cylinder; an ignition control means which controls the ignition means; and a proper value storage means which contains a proper value of the ignition timing which is set to improve an efficiency of the gas engine; wherein when the measurement value is less than the target value, the ignition control means may determine whether or not the ignition timing is retarded with respect to the proper value and compensate the ignition timing such that the ignition timing is advanced if the ignition timing is retarded with respect to the proper value. In accordance with this configuration, in a case where the measurement value is reduced to a value less than the target value by injecting the water, the ignition timing is compared to the proper value and is compensated to be advanced if the ignition timing is retarded with respect to the proper value. This makes it possible to improve the efficiency of the gas engine while preventing the knocking occurrence ratio from becoming an excessively high value. By an effect provided by a combination of the above stated water injection control and the ignition timing control, it becomes possible to achieve advantages together that the ignition timing is caused to converge at a value near the proper value and the measurement value of the knocking occurrence ratio is caused to converge at a value near the target value, if the control is executed for a long period of time.

The water injection control means may set a compensation value of the water injection amount based on the deviation between the measurement value and the target value, and may reflect the compensation amount on the water injection amount set in a previous engine cycle. In accordance with this configuration, since the compensation amount is reflected on the water injection amount set in a previous engine cycle, the measurement value of the knocking occurrence ratio can be suitably made closer to the target value without significantly increasing or decreasing the water injection amount.

The control system may further comprise a heavy knocking detecting means which detects a heavy knocking which is equal to or higher than a specified intensity level; and the water injection control means may compensate the water injection amount such that it is increased when the heavy knocking is detected. In accordance with this configuration, the cylinder internal temperature can be lowered quickly when the heaving knocking occurs. Therefore, if an event that will probably damage the engine arises, under a state in which the knocking occurrence ratio is controlled, this event can be addressed promptly, and suppressed quickly.

A method of controlling a gas engine, of the present invention comprises the steps of: measuring a measurement value of a knocking occurrence ratio in a cylinder in the gas engine; comparing the measurement value to a specified target value; and setting an amount of the water injected toward an interior of the cylinder, based on a deviation between the measurement value and the target value. In such a method, since the amount of the water injected toward the interior of the cylinder is set based on the deviation between the measurement value of the knocking occurrence ratio and the target value of the knocking occurrence ratio, it becomes possible to achieve advantages together that the knocking can be suppressed and the efficiency of the gas engine can be improved.

The method may further comprise the steps of: comparing the ignition timing to a proper value of the ignition timing set to improve an efficiency of the gas engine, when the measurement value is less than the target value; and compensating the ignition timing such that it is advanced when the ignition timing is retarded with respect to the proper value. In this method, when the measurement value of the knocking occurrence ratio is less than the target value and the ignition timing is retarded with respect to the proper value, the ignition timing is compensated to be advanced. This makes it possible to increase the knocking occurrence ratio so that it is closer to the target value, and improve the efficiency of the gas engine.

The step of setting the amount of the water injected toward the interior of the cylinder may include the steps of: calculating the deviation between the measurement value and the target value; setting a compensation amount of the water injection amount based on the deviation; and reflecting the compensation amount on the water injection amount set in a previous engine cycle. In accordance with this method, since the compensation amount is reflected on the water injection amount set in a previous engine cycle, the measurement value of the knocking occurrence ratio can be suitably made closer to the target value without significantly increasing or decreasing the water injection amount.

A gas engine of the present invention comprises the above stated control system. In accordance with the gas engine, it becomes possible to achieve advantages together that the knocking can be suppressed and the efficiency of the gas engine can be improved.

Advantageous Effects of Invention

In accordance with the present invention, it becomes possible to achieve advantages together that the knocking can be suppressed in good correspondence with an actual combustion state and the efficiency of the gas engine can be improved.

DESCRIPTION OF EMBODIMENTS

Hereinafter, an embodiment of the present invention will be described with reference to drawings. Throughout the drawings, the same or corresponding components are designated by the same reference symbols and will not be described in repetition.

Figure 1:
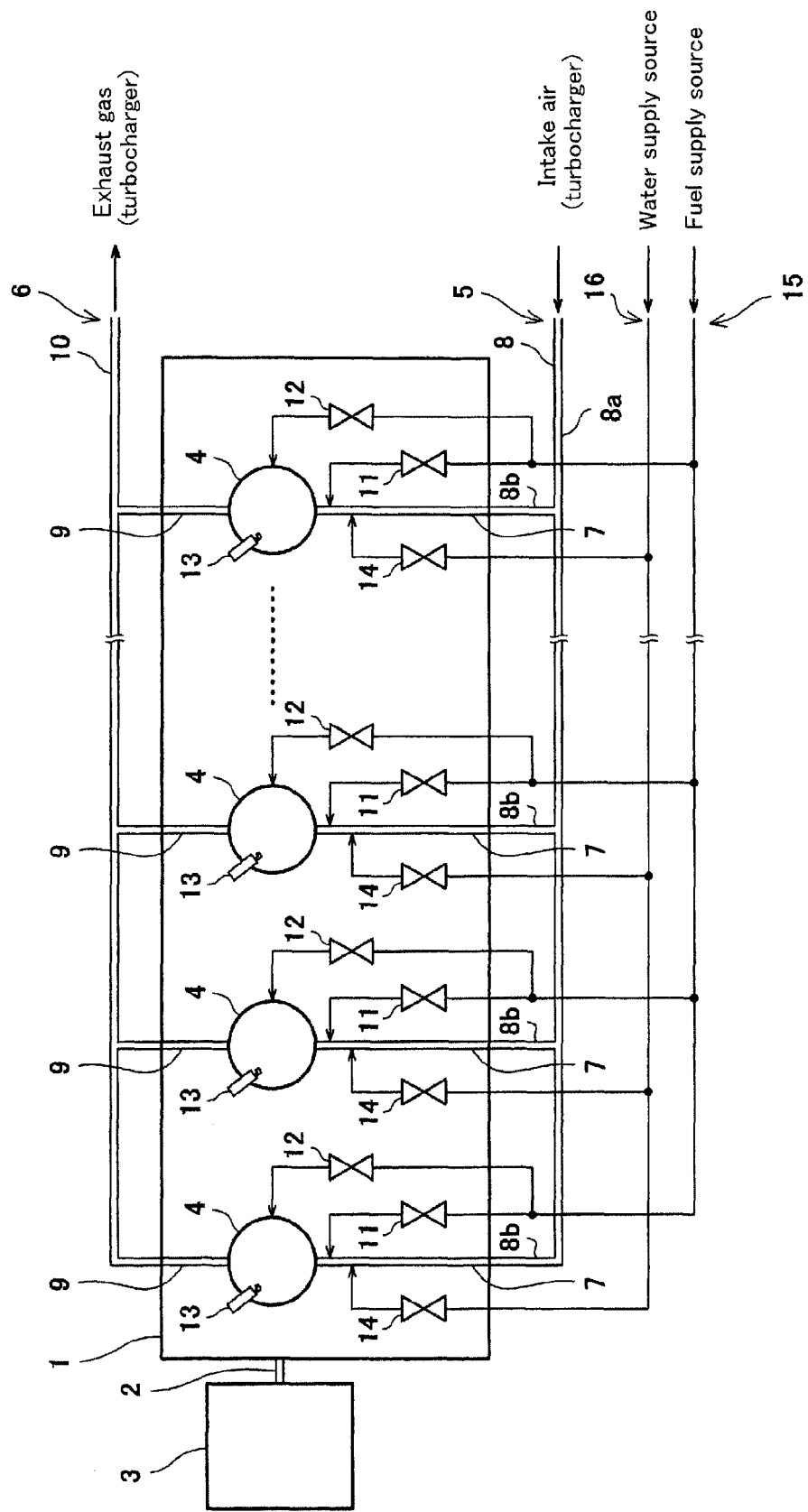
FIG. 1 is a conceptual view showing an overall construction of a gas engine according to an embodiment of the present invention.

FIG. 1 is a conceptual view showing an overall construction of a gas engine 1 according to the embodiment of the present invention. As shown in FIG. 1, the gas engine 1 is configured to combust an air-fuel mixture which is a mixture of a gas fuel and intake air to generate a rotational output at an output shaft 2. The output shaft 2 is connected to, for example, an AC power generator 3. The output shaft 2 may be connected to a ship propulsive apparatus in place of the AC power generator 3. In this way, the gas engine 1 of the present embodiment is suitably used as the driving power source of the AC power generator 3 or the ship propulsive apparatus.

The gas engine 1 is a reciprocating four-stroke engine and includes a plurality of cylinders 4. The cylinders 4 may be laid out in V-type instead of an in-line type shown in FIG. 1 for easier diagrammatical illustration. Especially, in the case of the gas engine for power generation or ship, the gas engine 1 includes many (e.g., 8 to 20) cylinders and is huge. In such engines, the cylinders are suitably laid out in V-type.

The gas engine 1 is provided with an air-intake passage 5, an exhaust passage 6 and a turbocharger (not shown). The air-intake passage 5 is a passage used to supply the intake air from the turbocharger to the cylinders 4. The air-intake passage 5 is composed of a plurality of intake ports 7 and an air-intake pipe 8. The intake ports 7 are provided for the cylinders 4, respectively, and formed inside of an engine main body. The intake ports 7 open in the corresponding cylinders 4 at downstream end portions thereof, respectively, and open in an outer surface of the engine main body at upstream end portions thereof. The air-intake pipe 8 includes a common pipe member 8a and a plurality of branch pipe members 8b. The common pipe member 8a extends in a direction in which the cylinders are laid out, outside of the engine main body. The branch pipe members 8b are provided for the cylinders 4, respectively, and connect the interior of the common pipe member 8a to the upstream end portions of the intake ports 7. The exhaust passage 6 is a passage through which an exhaust gas from the cylinders 4 is sent to outside via the turbocharger. The exhaust passage 6 is composed of exhaust ports 9 provided for the cylinders 4, respectively, and an exhaust pipe 10 connected to the exhaust ports 9.

Each of the cylinders 4 is provided with a first fuel injection valve 11, a second fuel injection valve 12, an ignition plug (ignition means or ignition device) 13, and a water injection valve (water injection means or water injection device) 14. The first fuel injection valve 11 and the second fuel injection valve 12 inject gas fuel sent from a fuel supply source along a fuel gas supply line 15, toward the interior of the cylinders 4. The ignition plug 13 generates a spark at suitable ignition timings to ignite and combust the air-fuel mixture supplied to the interior of the corresponding cylinder 4. The water injection valve 14 injects the water sent from a water supply source along a water supply line 16, toward the interior of the cylinder 4, to suppress occurrence of a knocking in the corresponding cylinder 4.

Figure 2:
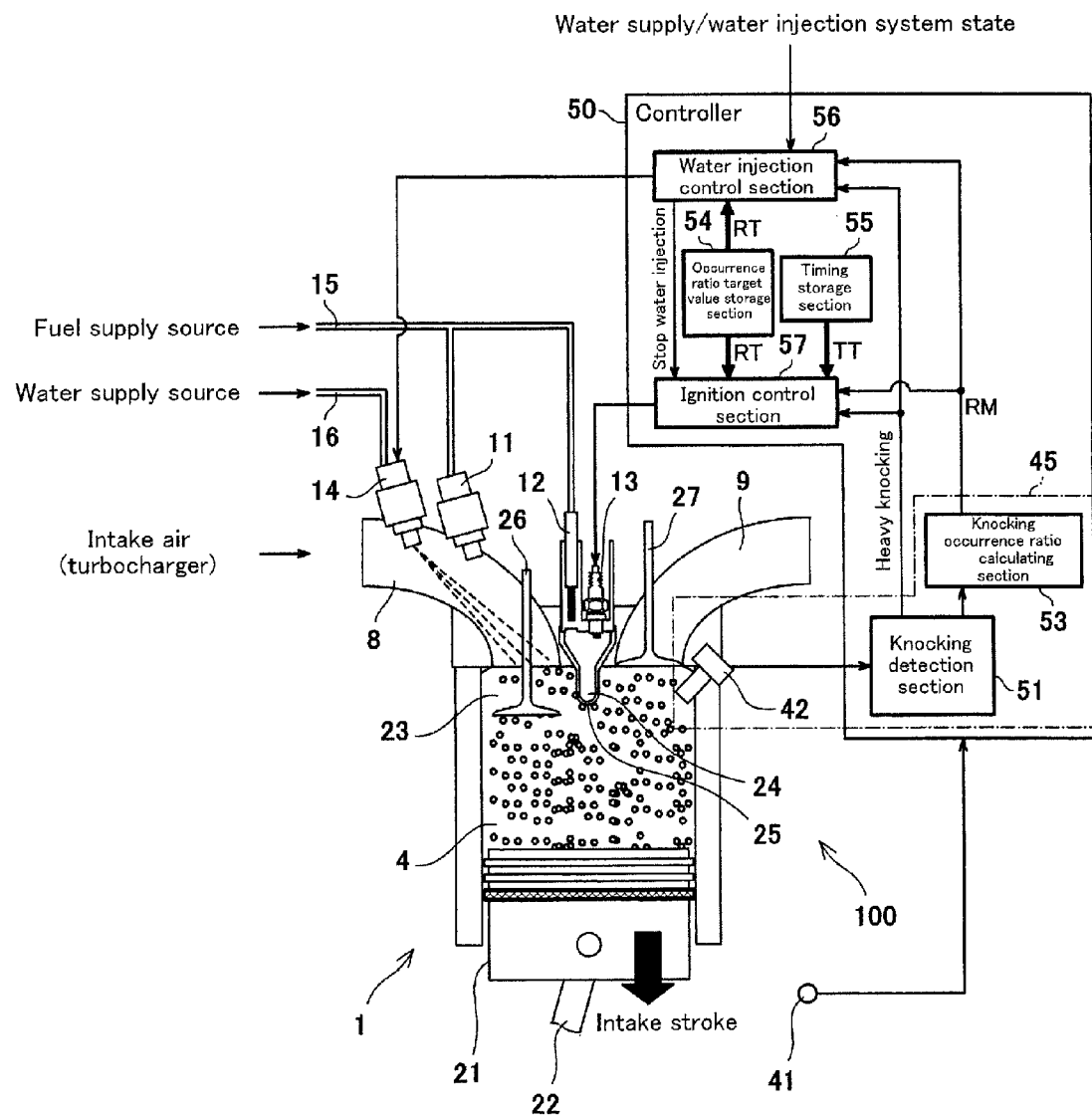
FIG. 2 is a conceptual view showing major components in a control system of a gas engine according to the embodiment of the present invention.

FIG. 2 is a conceptual view showing a construction of the control system 100 of the gas engine 1 according to the embodiment of the present invention. In FIG. 2, a single cylinder 4 is depicted as a representative cylinder, but other cylinders have the same configuration. As shown in FIG. 2, a piston 21 is reciprocatably inserted into the cylinder 4. The piston 21 is coupled to the output shaft 2 (see FIG. 1) via a connecting rod 22. A space of the cylinder 4, which is at an upper side of the piston 21, forms a main combustion chamber 23. The main combustion chamber 23 is separated from a sub-combustion chamber 24 via a separating wall 25, and is connected to the sub-combustion chamber 24 via a connection hole (not shown) formed in the separating wall 25. The cylinder 4 is provided with intake valve(s) 26 and exhaust valve(s) 27. The intake valve 26 opens and closes the downstream end portion of the intake port 7. The exhaust valve 27 opens and closes the upstream end portion of the exhaust port 9. The first fuel injection valve 11 is provided such that its fuel injection port faces the interior of the intake port 7. The second fuel injection valve 12 is provided such that its fuel injection port faces the interior of the sub-combustion chamber 24. The ignition plug 13 is provided such that the electrodes generating the spark face the interior of the sub-combustion chamber 24.

In an intake stroke in which the piston 21 is moving downward, the intake valve 26 opens the intake port 7 and the first fuel injection valve 11 injects the gas fuel. Thereby, the air-fuel mixture of the intake air and the gas fuel flowing through the intake port 7 is supplied to the interior of the main combustion chamber 23. In a compression stroke in which the piston 21 is moving upward, the air-fuel mixture is compressed in the interior of the main combustion chamber 23 and in the interior of the sub-combustion chamber 24. The second fuel injection valve 12 injects the gas fuel to the interior of the sub-combustion chamber 24 in the intake stroke or in the compression stroke. At a time near a timing when the compression stroke finishes, the ignition plug 13 generates a spark, which causes the air-fuel mixture in the interior of the sub-combustion chamber 24 to be ignited and combusted. A flame in the interior of the sub-combustion chamber 24 propagates to the interior of the main combustion chamber 23 through the connection hole. Thus, the air-fuel mixture in the interior of the main combustion chamber 23 is combusted, and hence the piston 21 moves downward. This is an expansion stroke. In an exhaust stroke after the expansion stroke, the exhaust valve 27 opens the exhaust port 9, so that the gas is exhausted from the interior of the main combustion chamber 23 and the interior of the sub-combustion chamber 24 to the exhaust passage 6. In the present specification, a cycle which goes through four strokes, which are the intake stroke, the compression stroke, the expansion stroke and the exhaust stroke, as described above, will be referred to one engine cycle.

The control system 100 of the gas engine 1 includes the ignition plug 11, the water injection valve 14, a phase angle sensor 41, a cylinder pressure sensor 42 and a controller 50. The controller 50 is a microcomputer mainly including, for example, a CPU, a ROM, a RAM and an input/output interface. An input side of the controller 50 is connected to the phase angle sensor 41 and the cylinder pressure sensor 42. The phase angle sensor 41 detects a rotational phase angle of the output shaft 2 (see FIG. 1). The cylinder pressure sensor 42 detects an internal pressure of the cylinder 4. An output side of the controller 50 is connected to the ignition plug 11 and the water injection valve 14.

The water injection valve 14 is provided such that its water injection port 14a faces the interior of the intake port 7. The water injection valve 14 is a normally-closed electromagnetic on-off valve which opens and closes the water injection port 14a. In a state in which the water injection port 14a is open, the water injection valve 14 injects the water sent thereto along the water supply line 16, toward the interior of the intake port 7. Since a pressure (hereinafter will be referred to as water supply pressure) of the water sent to the water injection valve 14 is substantially constant, the controller 50 can control the water injection amount by controlling an open duration of the water injection valve 14.

The water injected by the water injection valve 14 is supplied to the interior of the cylinder 4 along with the intake air. To enable the water to be supplied to the interior of the cylinder 4 well, a timing when the water is injected is roughly set to one in the middle of the intake stroke. The water supply pressure is adjusted to a value which is high enough to inject the water toward the interior of the intake port 7, against the air-intake pressure.

The control system 100 controls the water injection amount and the ignition timing for each of the cylinders 4 so that the knocking occurrence ratios of all of the cylinders 4 become close to a target value irrespective of a difference between the cylinders and efficiencies of all of the cylinders 4 are optimized irrespective of a difference between the cylinders. As functional sections for implementing such control, the controller 50 includes a knocking detection section 51, a knocking occurrence ratio calculating section 53, an occurrence ratio target value storage section 54, a timing storage section 55, a water injection control section 56 and an ignition control section 57. The cylinder pressure sensor 42 is provided for each of the cylinders 4. The phase angle sensor 41 is provided as a common sensor for all of the cylinders 4.

The knocking detection section 51 detects whether or not a knocking has occurred, for each cylinder 4 in every engine cycle, based on a result of detection performed by the cylinder pressure sensor 42. The knocking occurrence ratio calculating section 53 calculates a measurement value of a knocking occurrence ratio, for each cylinder 4 in every engine cycle, based on a result of detection performed by the knocking detection section 51. Thus, the cylinder pressure sensor 42, the knocking detection section 51, and the knocking occurrence ratio calculating section 53 constitute a knocking occurrence ratio measuring section 45 for measuring a knocking occurrence ratio in the cylinders 4.

The "knocking occurrence ratio" is an indicator directly indicating a frequency of occurrence of the knocking or a rate of occurrence of the knocking, and is an indicator indicating an actual combustion state. For example, the knocking occurrence ratio is calculated by dividing a total number of engine cycles in which the knocking has occurred during a passage of a predetermined number of engine cycles which are back from a present time point, by the predetermined number, and may change with time. Thus, the "knocking occurrence ratio" does not mean evaluation of a single measurement value obtained by the knocking detection section 51 in a particular engine cycle, but mean evaluation of a plurality of measurement values obtained by the knocking detection section 51 in respective of a plurality of engine cycles within a specified period from a past time point to a present time point. Thus, the "knocking occurrence ratio" includes a past history and hence has a characteristic which is easily handled as an evaluation indicator which is stable and does not fluctuate rapidly and steeply. Or, the "knocking occurrence ratio" may be calculated by moving average (simple moving average, weighted moving average, exponential weighted moving average).

Figure 3:
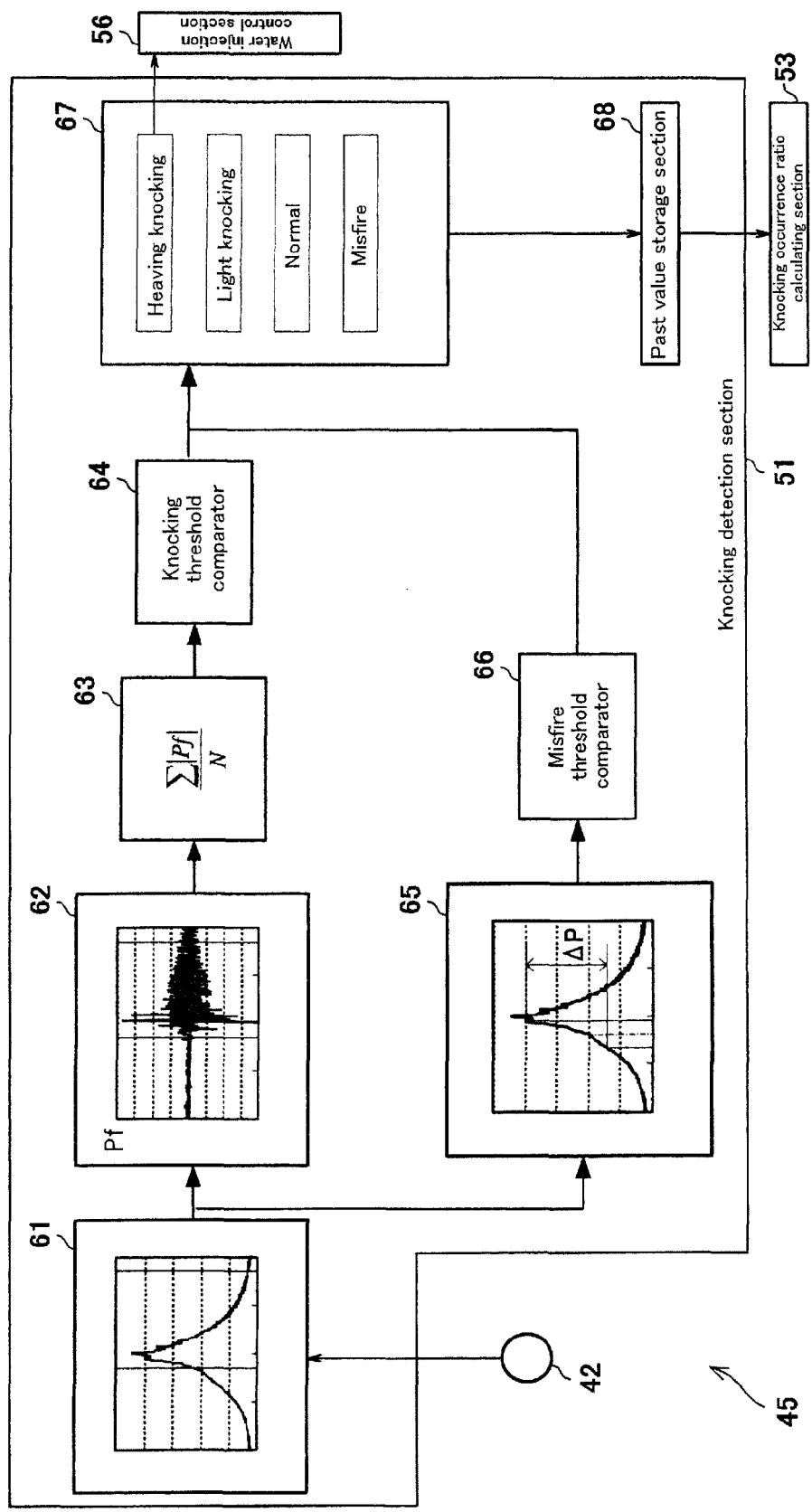
FIG. 3 is a block line diagram showing a configuration of a knocking occurrence ratio measuring section of FIG. 2.

FIG. 3 is a conceptual diagram showing a configuration of the knocking occurrence ratio measuring section 45. As shown in FIG. 3, the knocking detection section 51 includes a waveform measuring section 61, an extracting section 62, an average value calculating section 63, a knocking threshold comparator section 64, a cylinder pressure comparator section 65, a misfire threshold comparator section 66, a combustion state determiner section 67 and a past value storage section 68.

The waveform measuring section 61 measures a waveform of a cylinder pressure detected by the cylinder pressure sensor 42. The extracting section 62 filters cylinder pressure waveform data in a period from an end point of the compression stroke until specified time passes to extract its high frequency component(s). The average value calculating section 63 samples a plurality of high frequency components within the specified time, and calculates an average value of the sampled high frequency components. The knocking threshold comparator section 64 compares the calculated average value to a first knocking threshold and a second knocking threshold. The cylinder pressure comparator section 65 calculates a cylinder pressure deviation $\Delta P$ between the cylinder pressures before and after the end point of the compression stroke, based on the cylinder pressure waveform data. The misfire threshold comparator section 66 determines whether or not the calculated cylinder pressure deviation $\Delta P$ is equal to or greater than a misfire threshold.

The combustion state determiner section 67 determines which of the four states, i.e., "heavy knocking", "light knocking", "normal", and "misfire" the combustion state is, based on a result of the comparison performed by the knocking threshold comparator section 64 and a result of the comparison performed by the misfire threshold comparator section 66, for each cylinder 4 in every engine cycle. Specifically, when the average value is equal to or greater than the first knocking threshold, the combustion state determiner section 67 determines that the combustion state is "heavy knocking". When the average value is less than the first knocking threshold and equal to or greater than the second knocking threshold, the combustion state determiner section 67 determines that the combustion state is "light knocking". When the cylinder pressure deviation $\Delta P$ is less than the misfire threshold, the combustion state determiner section 67 determines that the combustion state is "misfire". When the average value is less than the second knocking threshold and the cylinder pressure deviation $\Delta P$ is equal to or greater than the misfire threshold, the combustion state determiner section 67 determines that the combustion state is "normal". The "heavy knocking" indicates a state in which a knocking which is equal to or greater than a predetermined intensity level defined by the first knocking threshold is occurring. The "light knocking" indicates a state in which a knocking which is less than the predetermined intensity level defined by the first knocking threshold is occurring. From this, it may be said that the combustion state determiner section 67 serves as a heavy knocking detection section for detecting a heavy knocking which is equal to or greater than the predetermined intensity level, or a light knocking detection section for detecting a light knocking which is less than the predetermined intensity level.

The past value storage section 68 sequentially stores the result of determination of the combustion state. The knocking occurrence ratio calculating section 53 reads, for example, the result of the determination of the combustion state stored in the past value storage section 68 and calculates a measurement value RM of the knocking occurrence ratio by dividing a total number of engine cycles for which it is determined that the light knocking or the heavy knocking has occurred during a passage of a predetermined number of engine cycles which are back from a present time point, by the predetermined number.

As shown in FIG. 2, the occurrence ratio target value storage section 54 contains a target value RT of the knocking occurrence ratio. If the gas engine 1 is run for a continued period under a state in which the measurement value RM of the knocking occurrence ratio is close to the target value RT, the efficiency of the gas engine 1 can be improved without causing significant damages to the gas engine 1. A specific numeric value of the target value for attaining such advantages can be known by a running test or numeric value analysis using an actual engine, etc. In the present embodiment, it is supposed that the occurrence ratio target value storage section 54 stores one target value RT common to all of the cylinders 4.

Figure 4:
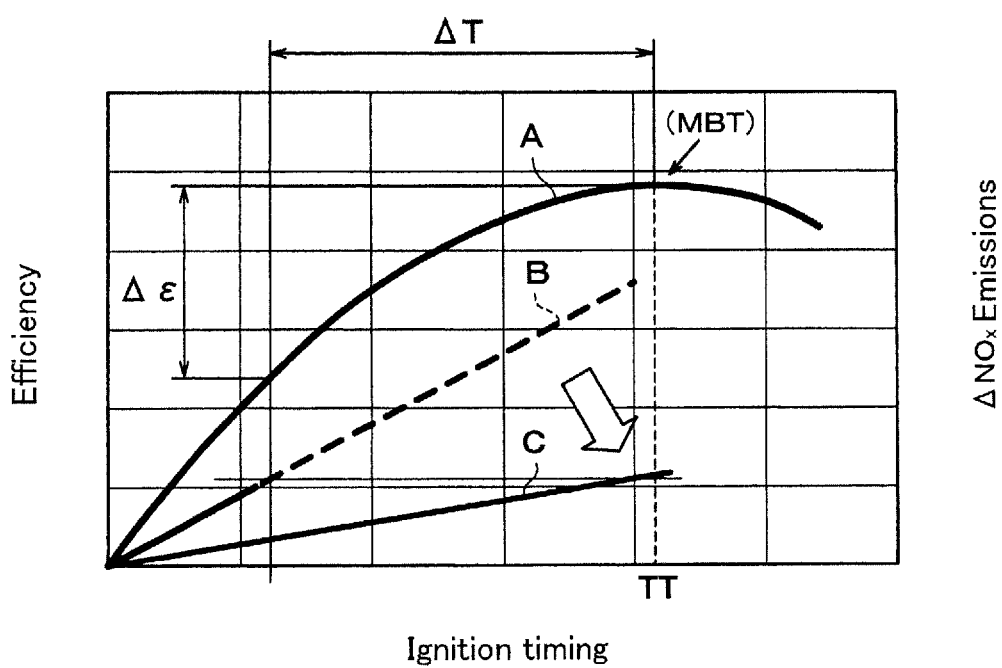
FIG. 4 is a graph showing a relationship between an ignition timing and an efficiency, a relationship between the ignition timing and NOx emissions, and a relationship between a water injection amount and the NOx emissions.

The timing storage section 55 contains a proper value TT and an initial value of the ignition timing. The proper value TT is an ignition timing set to improve the efficiency of the gas engine 1. In FIG. 4, a line A indicates a correlation between the ignition timing of a particular cylinder and the efficiency of the gas engine 1. The line A draws a curve protruding upward in a two-dimensional orthogonal coordinate system in which a horizontal axis indicates the ignition timing and a vertical axis indicates the efficiency. That is, as the ignition timing is advanced, the efficiency increases until the ignition timing reaches a certain timing (MBT). However, as the ignition timing is further advanced beyond MBT, the efficiency decreases. That is, MBT is the ignition timing at which an increasing/decreasing trend of the efficiency is reversed and the efficiency has a largest value. The timing storage section 55 stores a value at MBT or near MBT, as the proper value TT. MBT is varied from cylinder 4 to cylinder 4. Therefore, the timing storage section 55 stores the proper value TT for each cylinder 4. The proper value TT may be adjusted and updated depending on an actual running state of the gas engine 1. MBT in each cylinder 4 can be known by a running test using an actual engine. It should be noted that the initial value of the ignition timing is a value retarded with respect to the proper value TT, and is, for example, the ignition timing in an original point of a graph of FIG. 4.

As shown in FIG. 2, the water injection control section 56 finds a command value of the water injection amount based on the measurement value RM of the knocking occurrence ratio, the target value RT of the knocking occurrence ratio, a signal indicating that the heavy knocking is occurring, from the knocking detection section 51, a state of the water supply system, etc., and controls the water injection valve 14 so that the water is injected with an amount corresponding to the command value. The ignition control section 57 derives a command value of the ignition timing based on the measurement value RM of the knocking occurrence ratio, the target value RT of the knocking occurrence ratio, the proper value TT of the ignition timing, a water injection stop signal from the water injection control section 56, etc., and controls the ignition plug 11 so that the ignition plug 11 performs ignition at a timing corresponding to the command value.

Figure 5:
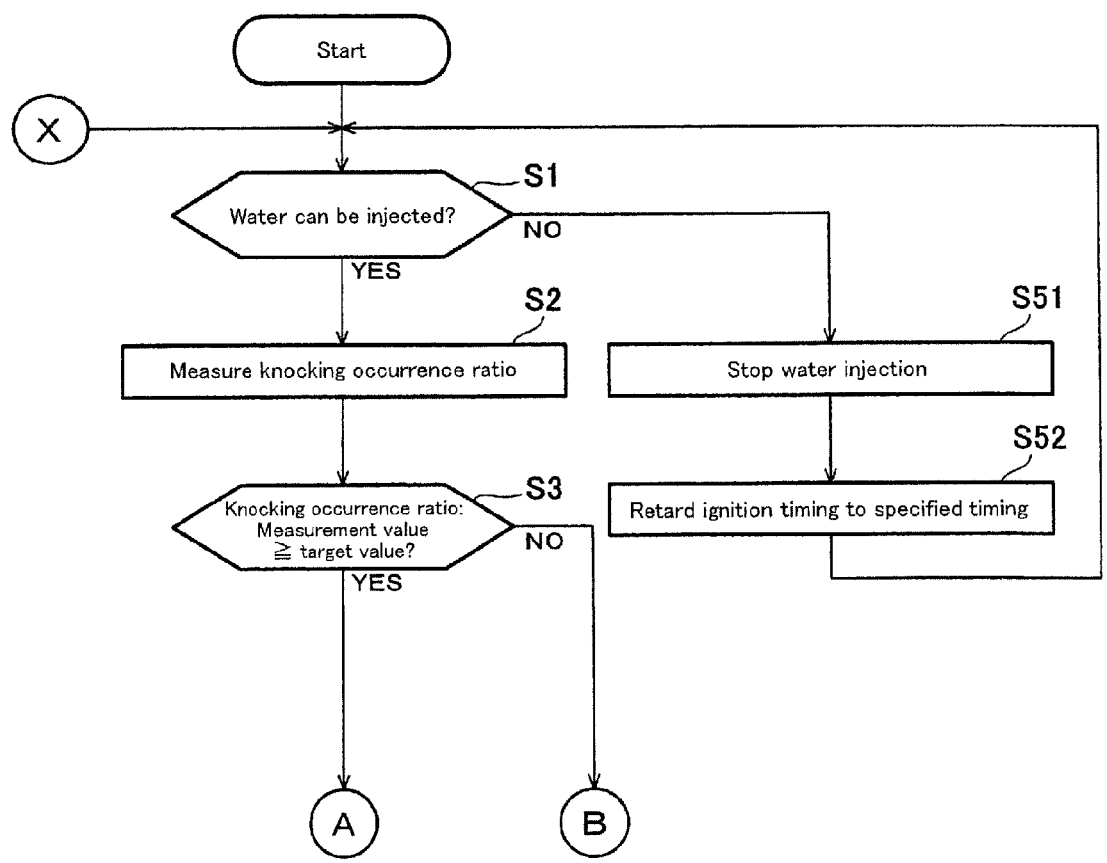
FIG. 5 is a flowchart showing a part of processing of water injection and ignition control.
Figure 6:
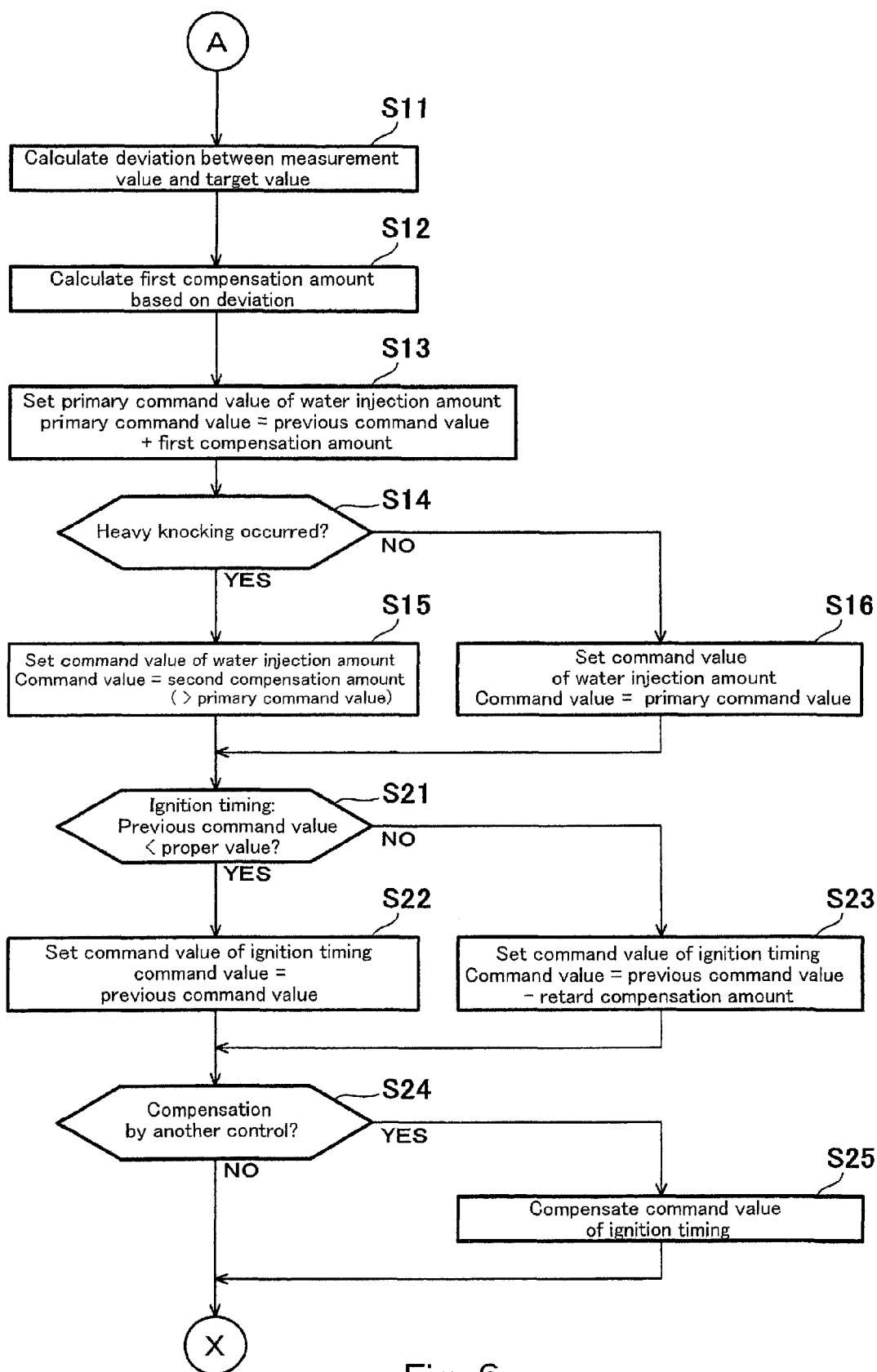
FIG. 6 is a flowchart showing a part of processing of water injection and ignition control and showing processing for setting a command value of the water injection amount and a command value of the ignition timing in a case where a measurement value of the knocking occurrence ratio is equal to or greater than a target value.
Figure 7:
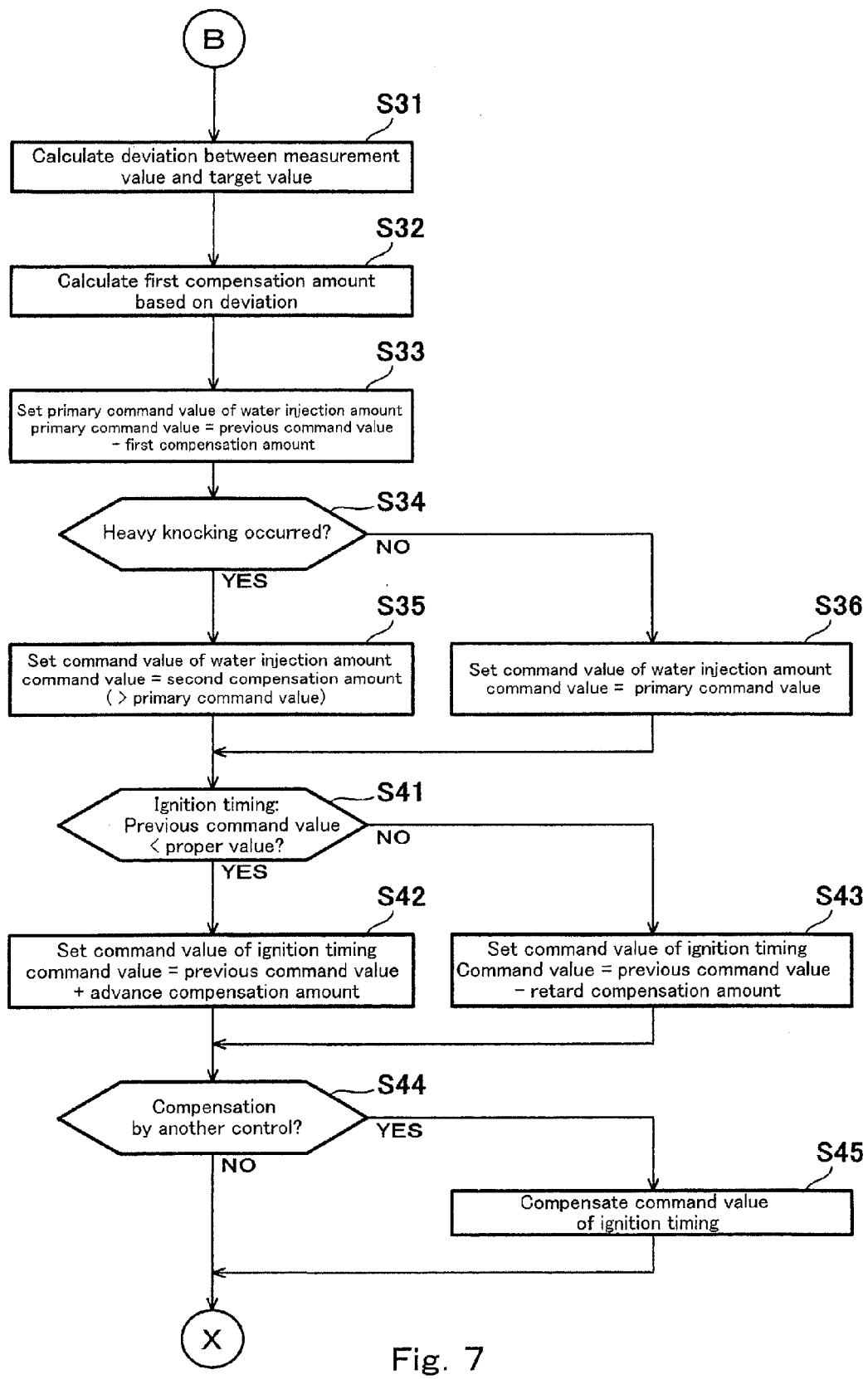
FIG. 7 is a flowchart showing a part of processing of water injection and ignition control and showing processing for setting a command value of the water injection amount and a command value of the ignition timing in a case where a measurement value of the knocking occurrence ratio is less than the target value.

FIGS. 5 to 7 are flowcharts showing the water injection control and the ignition control which are executed by the controller 50 of FIG. 2. The series of processing steps in FIGS. 5 to 7 are repeated in every engine cycle, after the start-up processing of the gas engine 1 is finished, for example. As shown in FIG. 5, the water injection control section 56 determines whether or not a present state is a state in which the water can be suitably injected toward the cylinder 4, based on the state of the water supply system (step S1). For example, the water injection control section 56 determines whether or not the water supply pressure is lower than a required pressure, or whether or not any trouble is occurring in a water supply source, based on signals received from sensors. If the water injection control section 56 determines that the water can be suitably injected toward the cylinder 4 (S1: YES), the knocking occurrence ratio measuring section 45 measures the measurement value RM of the knocking occurrence ratio (step S2). Then, the water injection control section 56 and the ignition control section 57 compare the measurement value RM of the knocking occurrence ratio to the target value RT of the knocking occurrence ratio (step S3).

If the water injection control section 56 and the ignition control section 57 determine that the measurement value RM is equal to or greater than the target value RT (S3: YES), the controller 50 moves to the flow of FIG. 6 and executes control for decreasing the measurement value RM such that it is closer to the target value RT. If the water injection control section 56 and the ignition control section 57 determine that the measurement value RM is less than the target value RT (S3: NO), the controller 50 moves to the flow of FIG. 7 and executes control for increasing the measurement value RM such that it is closer to the target value RT.

As shown in FIG. 6, if the measurement value RM is equal to or greater than the target value RT, the water injection control section 56 calculates a deviation between the target value RT and the measurement value RM (step S11). Then, the water injection control section 56 calculates a first compensation amount based on the calculated deviation (step S12). Then, the water injection control section 56 sets a primary command value in a present engine cycle (step S13). The primary command value of the water injection amount is derived by adding the first compensation amount calculated in step S12 in the present engine cycle, to the command value of the water injection amount calculated in step S13 in a previous engine cycle.

Then, the water injection control section 56 determines whether or not the combustion state in the present engine cycle is the heavy knocking based on a result of the detection performed by the knocking detection section 51 (step S14). If the water injection control section 56 determines that the heavy knocking is not occurring (S14: NO), it sets a command value of the water injection amount in a next engine cycle to the primary command value calculated in step S13 (step S16). If the water injection control section 56 determines that the heavy knocking is occurring (S14: YES), it calculates a second compensation amount and sets the command value of the water injection amount in the present engine cycle (command value of the water injection amount in an occasion in which the water is injected, just after setting of the command value) to the second compensation amount (step S15). It should be noted that the second compensation amount is greater than the primary command value calculated in step S13 and is used to compensate the water injection amount such that it is increased when the heavy knocking is detected. The second compensation amount may be set according to the knocking intensity level, or set by adding a predetermined compensation amount to the primary command value calculated in step S13. At this time, the command value calculated in the present engine cycle is decreased in the primary command value setting process in step S13 in the next engine cycle. Thus, even when the water injection amount is compensated to be increased due to occurrence of the heavy knocking, the command value of the water injection amount in next and the following engine cycles is not disordered.

Then, the ignition control section 57 determines whether or not a command value of the ignition timing in the previous engine cycle is less than the proper value TT (step S21). If the ignition control section 57 determines that the command value of the ignition timing in the previous engine cycle is less than the proper value TT (A21: YES), it sets the command value of the ignition timing in the present engine cycle to the command value in the previous engine cycle (step S22). If the ignition control section 57 determines that the command value in the previous engine cycle is equal to or greater than the proper value TT (A21: NO), it subtracts a predetermined retard compensation amount from the command value in the previous engine cycle, and sets the command value of the ignition timing in the present engine cycle to this value derived by the subtraction (step S23). If the ignition control section 57 determines that the command value in the previous engine cycle is equal to the proper value TT, the command value of the ignition timing may be a value derived by advancing the command value in the previous engine cycle by a small advance amount $\alpha$ ($>0$), or a value derived by retarding the command value in the previous engine cycle by a small retard amount $\alpha$ ($<0$).

In some cases, another control for controlling the ignition timing is executed in parallel for the purpose which is other than control of the knocking occurrence ratio. If such another control is executed in parallel, the ignition timing is compensated taking into account a command value set in another control (step S25). If another control is not executed in parallel (S24: NO), the command value of the ignition timing is the command value set in step S22 or step S23.

After the command value of the water injection amount and the command value of the ignition timing are set in the manner as described above, the water injection control section 56 controls the water injection valve 14 so that the water is injected with an amount corresponding to the command value, in the intake stroke, while referring to the signal received from the phase angle sensor 41. The ignition control section 57 controls ignition plug 13 so that the ignition plug 13 performs ignition at a timing corresponding to the command value, while referring to the signal received from the phase angle sensor 41. Then, processing in the next engine cycle is resumed from step S1.

As shown in FIG. 7, if the measurement value RM is less than the target value RT, the water injection control section 56 calculates a deviation between the target value RT and the measurement value RM (step S31). Then, the water injection control section 56 calculates a first compensation amount based on the calculated deviation (step S32). Then, the water injection control section 56 sets a primary command value in a present engine cycle (step S33). The primary command value of the water injection amount is derived by subtracting the first compensation amount calculated in step S32 in the present engine cycle, from the command value of the water injection amount calculated in step S33 in the previous engine cycle. Especially in a period from start-up of the gas engine to a steady running, the water injection control section 56 may set the command value in the present engine cycle to the primary command value in the previous engine cycle.

Then, the water injection control section 56 executes processing similar to that in steps S14 to step S16 described above. That is, the water injection control section 56 determines whether or not the heavy knocking is occurring in the present engine cycle (step S34). If the water injection control section 56 determines that the heavy knocking is not occurring (S34: NO), it sets the command value of the water injection amount in the next engine cycle to the primary command value calculated in step S33 (step S36). If the water injection control section 56 determines that the heavy knocking is occurring (S34: YES), it sets the command value of the water injection amount to the second compensation amount (step S35). The second compensation amount is greater than the primary command value calculated in step S33 and is used to compensate the water injection amount such that it is increased when the heavy knocking is detected. The second compensation amount may be set according to the knocking intensity level, or set by adding a predetermined compensation amount to the primary command value calculated in step S33. At this time, the command value calculated in the present engine cycle is changed such that it is decreased in the primary command value setting process in step S13 in the next engine cycle. Thus, even when the water injection amount is compensated such that it is increased due to occurrence of the heavy knocking, the command value of the water injection amount in next and the following engine cycles is not disordered.

If the measurement value RM is less than the target value RT, then the ignition control section 57 determines whether or not the command value of the ignition timing in the previous engine cycle is less than the proper value TT (step S41). If the ignition control section 57 determines that the command value of the ignition timing in the previous engine cycle is less than the proper value TT (A41: YES), it adds a predetermined advance compensation amount to the command value in the previous cycle, and sets the command value of the ignition timing in the present engine cycle to this value derived by the addition (step S42). If the ignition control section 57 determines that the command value in the previous engine cycle is equal to or greater than the proper value TT (A41: NO), it subtracts the predetermined retard compensation amount from the command value in the previous engine cycle, and sets the command value of the ignition timing in the present engine cycle to this value derived by the subtraction (step S43). If the ignition control section 57 determines that the command value in the previous engine cycle is equal to the proper value TT, the command value of the ignition timing may be a value derived by advancing the command value in the previous engine cycle by a small advance amount a ($>0$), or a value derived by retarding the command value in the previous engine cycle by a small retard amount $\alpha$ ($<0$). It should be noted that the initial value of the ignition timing is a small value retarded with respect to the proper value TT, and therefore, in an initial stage of the control, the controller 50 moves from step S41 to step S42 in most cases.

Then, like step S24 and step S25 as described above, the ignition timing is properly compensated in light of another control executed in parallel (step S44, step S45).

After the command value of the water injection amount and the command value of the ignition timing are set in the manner as described above, the water injection valve 14 and the ignition plug 11 are controlled as described above, and then, processing in the next engine cycle is resumed from step S1.

Figure 8:
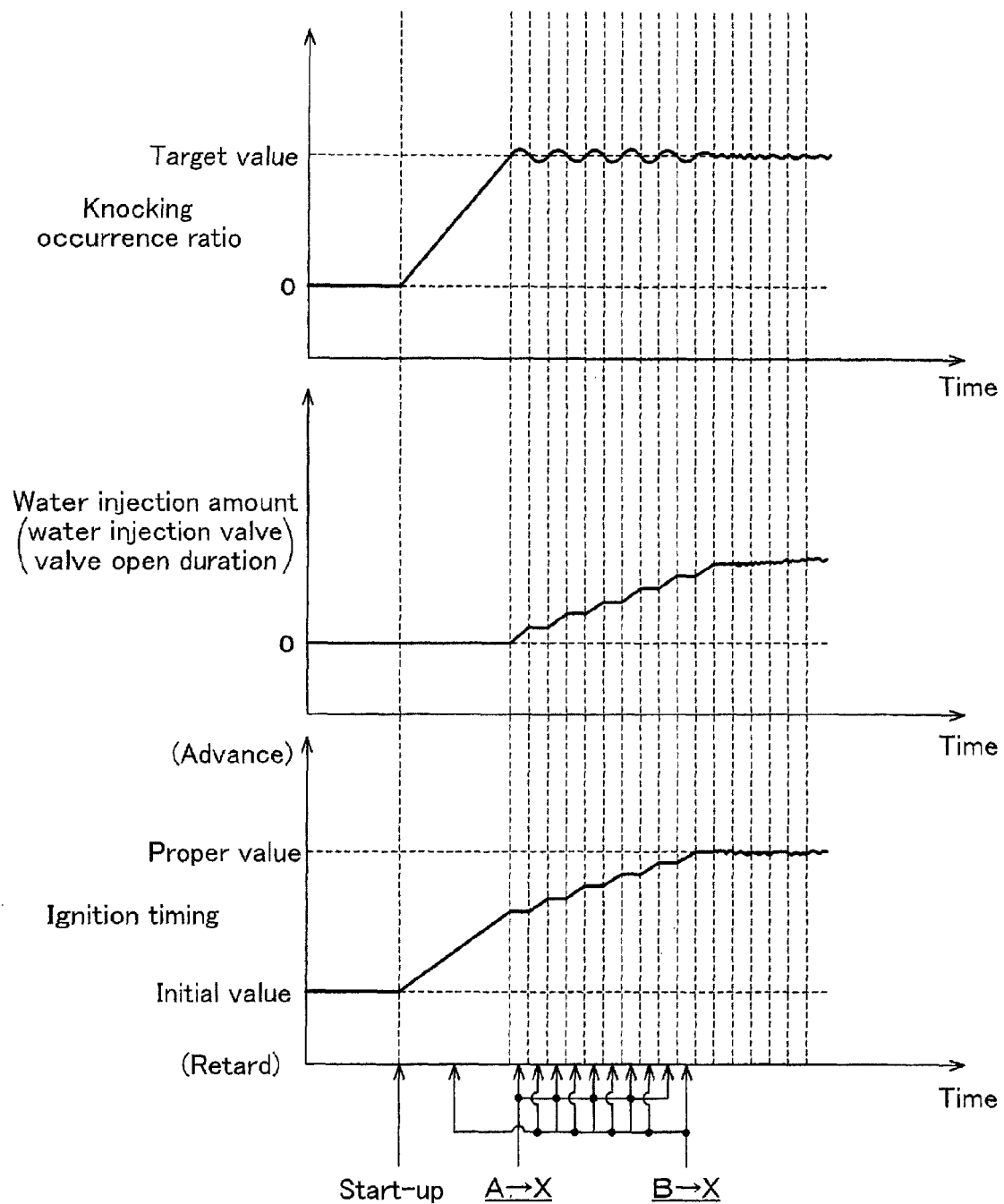
FIG. 8 is a timing chart showing examples of the knocking occurrence ratio, the water injection amount and the ignition timing, which change with time, in a case where the processing of FIGS. 5 to 7 is executed.

FIG. 8 is a flowchart showing examples of the measurement value of the knocking occurrence ratio, the water injection amount and the ignition timing, which change with time, in the case where the water injection control and the ignition control shown in FIGS. 5 to 7 are executed. At a time point when the start-up process of the gas engine 1 is finished, the measurement value of the knocking occurrence ratio is a very small value which is less than the target value and is near zero. The command value of the ignition timing is set to the initial value prestored in the timing storage section 55. The command value of the water injection amount is set to zero. The initial value of the ignition timing is retarded with respect to the proper value.

Therefore, the processing in step S5 is repeated by way of step S42. Thereby, the water injection amount remains zero, while the ignition timing continues to be advanced. Since the ignition timing continues to be advanced without injecting the water, a combustion temperature gradually rises, and the measurement value of the knocking occurrence ratio increases toward the target value RM. At a time point when the measurement value of the knocking occurrence ratio exceeds the target value RM, processing in FIG. 6 is executed. Thereby, advancement of the ignition timing stops but the water injection amount continues to increase. Thus, the cylinder internal temperature is lowered by latent heat of evaporation of water, and as a result, measurement value of the knocking occurrence ratio decreases. At this time, since the ignition timing is not retarded, the measurement value of the knocking occurrence ratio is decreased, but the efficiency is not substantially reduced.

When the measurement value of the knocking occurrence ratio is decreased to a value which is less than the target value as a result of increasing the water injection amount, the processing in FIG. 5 is executed. Thereby, increasing of the water injection amount stops, but the ignition timing is advanced again toward the proper value TT. Thus, the measurement value of the knocking occurrence ratio increases again toward the target value. Thereafter, until the ignition timing reaches the proper value, increasing of the water injection amount and advancement of the ignition timing are performed, and for example, they are repeated alternately. After the ignition timing has increased and reached the proper value, the measurement value of the knocking occurrence ratio converges at a value near the target value, and the ignition timing converges at a value near the proper value.

In accordance with the control system 100 of the gas engine 1 of the present embodiment, the measurement value of the knocking occurrence ratio is compared to the target value of the knocking occurrence ratio and the water is injected toward the interior of the cylinder. That is, random water injection is not performed, or water injection based on a running parameter which does not directly indicate a knocking occurrence state is not performed, but the water injection amount is set based on the occurrence frequency and the target value of the knocking. This allows the cylinder internal temperature to be lowered by the latent heat of evaporation of the water injected toward the interior of the cylinder, and hence the knocking to be lessened. Since the knocking is lessened, it becomes possible to ensure an advancement allowance of the ignition timing (amount with which the ignition timing can be advanced) within a range in which the measurement value of the knocking occurrence ratio can be prevented from increasing excessively. Because of this, the efficiency of the gas engine 1 can be improved.

Especially, the water injection control section 56 calculates the deviation between the measurement value and the target value and compensates the command value of the water injection amount using the compensation amount calculated based on the deviation. This suitably allows the measurement value to be close to the target value. Therefore, the advancement allowance of the ignition timing (amount with which the ignition timing can be advanced) ensured to increase the measurement value so that it becomes close to the target value can be made the best use of while allowing the knocking occurrence ratio to converge at a value near the target value. Thus, the efficiency of the gas engine 1 can be improved well.

In FIG. 4, each of line B and line C represents a correlation between the ignition timing and NOx emissions. The line B indicates the NOx emissions with respect to the ignition timing in a case where no water is injected. The line C indicates the NOx emissions with respect to the ignition timing in a case where the knocking occurrence ratio is maintained at the target value because of the effect produced by injecting the water. As indicated by the line B, as the ignition timing is advanced without injecting the water, the combustion temperature rises, and the NOx emissions increase correspondingly. By comparison, as indicated by the line C, as the ignition timing is advanced while injecting the water, an increase in the combustion temperature can be suppressed effectively. As a result, even when the gas engine 1 is run under a state in the ignition timing is advanced up to a value near the proper value TT, an increase in the NOx emissions can be suppressed effectively. When the efficiency is considered on the basis of the NOx emissions, it may be said that the efficiency can be improved by an efficiency difference $\Delta\epsilon$ corresponding to the ignition timing difference $\Delta T$, by executing the control for maintaining the knocking occurrence ratio at the target value by utilizing the water injection.

As should be understood from the above, in accordance with the control system 100 of the present embodiment, it becomes possible to achieve advantages together, that the knocking occurrence ratio is caused to converge at the target value, the efficiency can be increased as high as possible with an optimized relation with the ignition timing, and an increase in the NOx emissions can be suppressed. The past values are required to measure the knocking occurrence ratio, while easiness of occurrence of the knocking depends on a load fluctuation in the engine. In view of this, if the control system 100 is applied to gas engines in which a load fluctuation is relatively less, such as huge gas engines for power generation and huge gas engines for ship, it becomes possible to noticeably achieve the above advantages together, and thus the control system 100 is very useful in such cases.

If the heavy knocking occurs, the water injection amount is compensated to be increased for a moment in the next engine cycle, thereby lowering the cylinder internal temperature quickly. Therefore, in a case where an event that will probably damage the engine abruptly arises under a state in which the measured data is controlled using the past value which is the knocking occurrence ratio, this event can be addressed promptly, and suppressed quickly. To implement such control, in the present embodiment, the command value of the water injection amount is derived in such a manner that the second compensation amount is calculated as the command value of the water injection amount, if the heavy knocking occurs. Alternatively, the second compensation amount may be set based on the knocking intensity level. In this case, the command value calculated in the present engine cycle is changed in the next and following engine cycles. Thus, even when the water injection amount is compensated to be increased due to occurrence of the heavy knocking, the command value of the water injection amount in next and the following engine cycles is not disordered.

As shown in FIG. 5, if it becomes difficult to inject the water suitably (S1: NO), the water injection control section 56 causes the water injection valve 14 to stop the water injection, for example, by setting the command value of the water injection amount to zero (step S51). In response to this, the ignition control section 57 retards the ignition timing to a specified timing (step S52). The specified timing is an ignition timing at which the knocking is less likely to occur even when injecting of the water is stopped, and is, for example, the initial value, or timing which is retarded with respect to the initial value. By incorporating such processing, it becomes possible to avoid a situation in which the knocking occurs frequently, even under the situation in which the water cannot be suitably injected.

Although the embodiment of the present invention has been described, the above described configuration may be suitably changed within a scope of the present invention. For example, the water injection valve 14 may be configured in any way so long as it is able to inject the water toward the interior of the corresponding cylinder 4. For example, the water injection port 14a may be provided so as to face the interior of the sub-combustion chamber 24 or the interior of the branch pipe 8b. The water injection unit which is a means which injects the water to the cylinder is not limited to the water injection valve 14, and another device such as a carburetor may be used.

INDUSTRIAL APPLICABILITY

The present invention can achieve advantages together that the knocking can be suppressed and the efficiency of the gas engine improved, and is effectively applied to multi-cylinder reciprocating gas engines, especially huge gas engines for power generation or huge gas engines for ship.

REFERENCE SIGNS LIST 1 gas engine
4 cylinder
13 ignition plug
14 water injection valve
42 cylinder pressure sensor
45 knocking occurrence ratio measuring section
51 knocking detection section
53 knocking occurrence ratio calculating section
54 occurrence ratio target value storage section
55 timing storage section
56 water injection section
57 ignition control section
67 combustion state determiner section
100 control system

The invention claimed is:

1. A control system in a gas engine comprising:
a water injector which injects water toward an interior of a cylinder in the gas engine;
a water injection control device which controls an amount of the water injected from the water injector; and
a knocking occurrence ratio measuring device which obtains a measurement value of a knocking occurrence ratio in the cylinder, the knocking occurrence ratio being calculated based on a number of engine cycles during a predetermined period, which precedes a present time, and a total value of the engine cycles in which knocking has occurred within the predetermined period, wherein
the water injection control device controls the water injector to set the amount of the water injected toward the interior of the cylinder, based on a deviation between the measurement value and a target value, and
the water injection control device (i) sets a compensation amount of the water injection amount based on the deviation between the measurement value and the target value, and (ii) compensates the water injection amount set in a previous engine cycle based on the compensation amount.

2. A gas engine comprising the control system as recited in claim 1.

3. The control system in the gas engine according to claim 1, further comprising:
an igniter which ignites an air-fuel mixture supplied to the interior of the cylinder;
an ignition control device which controls the igniter; and
a timing storage device which contains a proper value of an ignition timing which is set to improve an efficiency of the gas engine,
wherein when the measurement value is less than the target value, the ignition control device determines whether or not the ignition timing is retarded with respect to the proper value and compensates the ignition timing such that the ignition timing is advanced if the ignition timing is retarded with respect to the proper value.

4. A gas engine comprising the control system as recited in claim 3.

5. The control system in the gas engine according to claim 1, further comprising:
a heavy knocking detector which detects a heavy knocking which is equal to or greater than a specified intensity level,
wherein the water injection control device compensates the water injection amount such that the water injection amount is increased when the heavy knocking is detected.

6. A gas engine comprising the control system as recited in claim 5.

7. A method of controlling a gas engine, comprising the steps of:
obtaining a measurement value of a knocking occurrence ratio in a cylinder in the gas engine, the knocking occurrence ratio being calculated based on a number of engine cycles during a predetermined period, which precedes a present time, and a total value of the engine cycles in which knocking has occurred within the predetermined period;
comparing the measurement value to a specified target value; and
setting an amount of water injected toward an interior of the cylinder, based on a deviation between the measurement value and the target value,
wherein setting the amount of the water injected toward the interior of the cylinder includes the steps of:
calculating the deviation between the measurement value and the target value;
setting a compensation amount of the water injection amount based on the deviation; and
compensating the water injection amount set in a previous engine cycle based on the compensation amount.

8. The method of controlling the gas engine according to claim 7, further comprising the steps of:
comparing an ignition timing to a proper value of the ignition timing set to improve an efficiency of the gas engine, when the measurement value is less than the target value; and
compensating the ignition timing such that the ignition timing is advanced when the ignition timing is retarded with respect to the proper value.

9. The control system in the gas engine according to claim 3, further comprising:
a heavy knocking detector which detects a heavy knocking which is equal to or greater than a specified intensity level,
wherein the water injection control device compensates the water injection amount such that the water injection amount is increased when the heavy knocking is detected.

10. A gas engine comprising the control system as recited in claim 9.

* * * * *